United States Patent
Debaud et al.

(10) Patent No.: US 7,262,250 B2
(45) Date of Patent: Aug. 28, 2007

(54) SCORCH-RETARDANT COMPOSITION

(75) Inventors: Fabien Debaud, Lyons (FR); Alfredo Defrancisci, Lyons (FR); Olivier Guerret, Mazerolles (FR); Jacques Kervennal, Lyons (FR)

(73) Assignee: Arkema France, Puteaux (FR)

( * ) Notice: Subject to any disclaimer, the term of this patent is extended or adjusted under 35 U.S.C. 154(b) by 358 days.

(21) Appl. No.: 11/122,431

(22) Filed: Apr. 29, 2005

(65) Prior Publication Data

US 2005/0192419 A1   Sep. 1, 2005

Related U.S. Application Data

(63) Continuation of application No. 10/406,008, filed on Apr. 3, 2003, now abandoned.

(30) Foreign Application Priority Data

Oct. 3, 2000   (FR) .................................. 00/12581

(51) Int. Cl.
*C08F 4/00* (2006.01)

(52) U.S. Cl. ...................... 525/204; 526/270; 526/311; 526/308; 526/263

(58) Field of Classification Search ................ 526/204, 526/270, 311, 308, 263
See application file for complete search history.

(56) References Cited

U.S. PATENT DOCUMENTS

| | | | |
|---|---|---|---|
| 3,202,648 A | | 8/1965 | Latourette et al. |
| 3,335,124 A | | 8/1967 | Larsen |
| 3,954,907 A | | 5/1976 | Schober |
| 4,857,571 A | | 8/1989 | Reiter et al. |
| 5,449,724 A | * | 9/1995 | Moffat et al. ................ 526/204 |
| 5,552,502 A | * | 9/1996 | Odell et al. .................. 526/234 |
| 6,653,409 B2 | * | 11/2003 | Ashiura et al. ........... 525/332.8 |

FOREIGN PATENT DOCUMENTS

| | | | |
|---|---|---|---|
| GB | 1535039 | | 12/1978 |
| JP | 11-049865 | * | 2/1999 |
| JP | 11049865 | | 2/1999 |

OTHER PUBLICATIONS

"Rubbery Materials and Their Compounds", J.A. Brydson, Elsevier Applied Sciences, 1988, p. 369.

* cited by examiner

*Primary Examiner*—Ling-Sui Choi
(74) *Attorney, Agent, or Firm*—Steven D. Boyd

(57) ABSTRACT

The present invention relates to the prevention of scorching before crosslinking of a thermoplastic and/or elastomeric composition with peroxides or azo compounds. This is achieved by using a family of specific nitroxides as additive.

20 Claims, No Drawings

SCORCH-RETARDANT COMPOSITION

This application is a continuation of application Ser. No. 10/406,008 filed Apr. 3, 2003 now abandoned.

BACKGROUND OF THE INVENTION (i) Field of the Invention

The present invention relates to the prevention of scorching before crosslinking of a thermoplastic and/or elastomeric composition with peroxides or azo compounds.

(ii) Description of Related Art

Premature crosslinking (scorching) during the preparatory phase is a major difficulty in the use of peroxides and azo compounds in crosslinking (curing) applications of elastomeric and/or thermoplastic materials. The preparatory phase consists in general in blending the constituents and optionally extruding them at temperatures that are often high. The operating conditions of this preparatory phase quite often lead to decomposition of the peroxide or azo initiator, thus inducing the crosslinking reaction with formation of gel particles in the bulk of the blend. The presence of these gel particles leads to imperfections (inhomogeneity or surface roughness) of the final product. Excessive scorching reduces the plastic properties of the material, such that the said material can no longer be converted, leading to loss of the entire batch. In addition, excessive scorching may lead to the total stoppage of the extrusion operation.

Several solutions have been proposed to overcome this drawback. Thus, it has been proposed to use an initiator with a halflife of 10 hours at high temperature. The drawbacks of this approach are the low production efficiency due to a long curing time and the high energy costs.

It has also been proposed to incorporate certain additives in order to reduce the scorch tendency. Thus, the use of organic hydroperoxides as scorch inhibitors for polyethylene-based compositions crosslinked with a peroxide was described in British patent GB 1 535 039. The use of vinyl monomers was the subject of patent U.S. Pat. No. 3,954,907. The use of nitrites was described in patent U.S. Pat. No. 3,202,648. Patent U.S. Pat. No. 3,335,124 describes the use of aromatic amines, phenolic compounds, mercaptothiazole compounds, sulphides, hydroquinones and dialkyl dithiocarbamate compounds.

Very recently, the use of 2,2,6,6-tetramethylpiperidyloxy (TEMPO) and 4-hydroxy-2,2,6,6-tetramethylpiperidyloxy (4-hydroxy TEMPO) was the subject of a Japanese patent application JP 11-49865.

However, the use of the additives of the prior art cited above to increase the scorch-resistance time has a harmful effect on the curing time and/or on the final crosslinking density. It leads to a reduction in the production efficiency and/or properties of the final product.

SUMMARY OF THE INVENTION

The present invention eliminates the drawbacks of the art cited above since it makes it possible to improve the scorch resistance or the crosslinking density without this having a negative impact on the crosslinking time. This is achieved by using a family of specific nitroxides as additive.

A first subject of the present invention is thus a scorch-retardant composition comprising a nitroxide (N) containing at least one unsaturation. Nitroxides (N) which may be used, for example, are those represented by the following formulae:

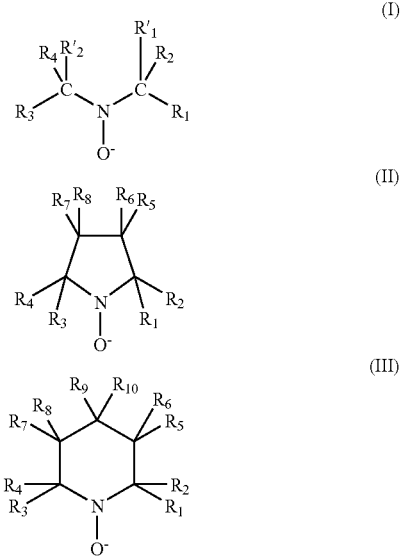

in which at least one of the substituents $R'_1$, $R'_2$, $R_1$, $R_2$, $R_3$, $R_4$, $R_5$, $R_6$, $R_7$, $R_8$, $R_9$ and $R_{10}$ contains at least one unsaturation which is reactive towards free-radical addition. The remaining substituents, which may be identical or different, represent a hydrogen atom, a halogen atom such as fluorine, chlorine, bromine or iodine, a linear, branched or cyclic, saturated hydrocarbon-based group such as an alkyl radical, a substituted or unsubstituted aromatic group, a cyano group —CN, an amide group —CONRR$_a$, an ester group —COOR, an alkoxy group —OR, a phosphonate group —PO(OR)(OR$_a$), a hydroxyl group —OH or an acid group such as —COOH or —PO(OH)$_2$ or SO$_3$H. R and R$_a$, which may be identical or different, may represent a hydrogen atom, a linear, branched or cyclic alkyl group containing a number of carbons ranging from 1 to 20, or an optionally substituted phenyl group.

The substituents containing at least one unsaturation may each in particular represent a linear, branched or cyclic unsaturated hydrocarbon-based group or an acrylate, methacrylate, acrylamide or methacrylamide group. When several unsaturations are present on the same group, these may be conjugated, such as, for example, in a butadienyl group, or unconjugated.

When the abovementioned formulae also comprise at least one substituent containing at least one unsaturation, a hydroxyl group and/or an acid group, the hydroxyl group and/or the acid group is preferably represented by $R_5$, $R_6$, $R_7$, $R_8$, $R_9$ and $R_{10}$.

An aspect of the present invention is also a scorch-retardant crosslinking composition (C) comprising a nitroxide (N) and a free-radical initiator comprising organic peroxides and azo compounds, and mixtures thereof.

Another subject of the invention is a crosslinkable composition (A) comprising a thermoplastic polymer and/or elastomeric polymer which may be crosslinked by means of a peroxide or an azo compound, a nitroxide (N) and a free-radical initiator chosen from the group consisting of organic peroxides and azo compounds, and mixtures thereof.

The present invention also provides a process for crosslinking a crosslinkable composition comprising a thermoplastic polymer and/or an elastomeric polymer which may be crosslinked by means of a peroxide or an azo compound, in which the said polymer is mixed with a free-radical initiator chosen from the group consisting of organic peroxides and azo compounds, and mixtures thereof, in the presence of a nitroxide (N).

The present invention also provides moulded or extruded articles such as electrical cables or wires obtained from a crosslinkable composition (A).

DETAILED DESCRIPTION OF PREFERRED EMBODIMENTS

According to the present invention, a nitroxide (N) of formula (III) is preferably used, in which:
$R_1$, $R_2$, $R_3$ and $R_4$, which may be identical or different, represent a methyl, ethyl, propyl, isopropyl, butyl, sec-butyl or tert-butyl radical,
$R_5$, $R_6$, $R_7$, $R_8$ and $R_9$ each represent a hydrogen atom, and $R_{10}$ represents a linear, branched or cyclic unsaturated hydrocarbon-based group or an acrylate, acrylamide, methacrylate or methacrylamide group.
Mention may be made, for example, of:
2,2,6,6-tetraethyl-4-piperidyloxy acrylate
2,2,6,6-tetraethyl-4-piperidyloxy methacrylate.
It is preferred to use, in particular, a nitroxide (N) containing an unsaturation, represented by formula (IV):

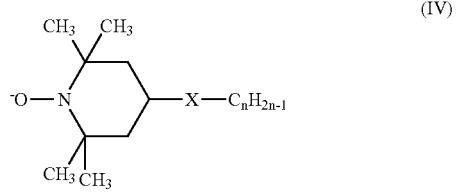

(IV)

in which X represents a divalent group —OC(O)—, —NRbC(O)— or —P(O)(OR$_b$)O— with R$_b$ having the same meaning as R and n is an integer which may range from 2 to 20 and preferably from 2 to 10. The position of the unsaturation on the group $C_nH_{2n-1}$ is irrelevant, but unsaturations located either in position 1 relative to X or in the terminal position are preferred.
Mention may be made, for example, of:
2,2,6,6-tetramethyl-4-piperidyloxy acrylate
2,2,6,6-tetramethyl-4-piperidyloxy methacrylate
2,2,6,6-tetramethyl-4-piperidyloxyacrylamide
2,2,6,6-tetramethyl4-piperidyloxymethacrylamide.
According to the present invention, compounds which may be used as free-radical initiators are azo compounds and/or organic peroxides, which, upon thermal decomposition, produce free radicals which facilitate the curing/crosslinking reaction. Among the free-radical initiators used as crosslinking agents, dialkyl peroxides and diperoxyketals are preferred. A detailed description of these compounds will be found in Encyclopedia of Chemical Technology, 3rd edition, vol. 17, pages 27 to 90 (1982).

Among the dialkyl peroxides, the preferred initiators are: dicumyl peroxide, di-t-butyl peroxide, t-butylcumyl peroxide, 2,5-dimethyl-2,5-di(t-butylperoxy)hexane, 2,5-dimethyl-2,5-di(t-amylperoxy)hexane, 2,5-dimethyl-2,5-di(t-butylperoxy)-3-hexyne, 2,5-dimethyl-2,5-di(t-amylperoxy)-3-hexyne, α, α'-di[(t-butylperoxy)-isopropyl]benzene, di-t-amyl peroxide, 1,3,5-tri[(t-butylperoxy)isopropyl]benzene, 1,3-dimethyl-3-(t-butylperoxy)butanol and 1,3-dimethyl-3-(t-amylperoxy)butanol, and mixtures thereof.

Among the diperoxyketals, the preferred initiators are: 1,1-di(t-butylperoxy)-3,3,5-trimethylcyclohexane, 1,1-di(t-butylperoxy)cyclohexane, n-butyl 4,4-di(t-amylperoxy)valerate, ethyl 3,3-di(t-butylperoxy)butyrate, 2,2-di(t-amylperoxy)propane, 3,6,6,9,9-pentamethyl-3-ethoxycarbonylmethyl-1,2,4,5-tetraoxacyclononane, n-butyl 4,4-bis(t-butylperoxy)valerate and ethyl 3,3-di(t-amylperoxy)butyrate, and mixtures thereof.

Azo compounds which may be mentioned, for example, are 2,2'-azobis(2-acetoxypropane), azobisisobutyronitrile, azodicarbamide, 4,4'-azobis(cyanopentanoic acid) and 2,2'-azobismethylbutyronitrile.

Dicumyl peroxide and α,α'-di[(t-butylperoxy)isopropyl]benzene are particularly preferred.

The thermoplastic and/or elastomeric polymers taken into consideration in the present invention may be defined as natural or synthetic polymers which have a thermoplastic and/or elastomeric nature and which may be crosslinked (cured) under the action of a crosslinking agent. In Rubber World, "Elastomer Crosslinking with Diperoxyketals", October 1983, pages 26-32, and in Rubber and Plastic News, "Organic Peroxides for Rubber Crosslinking", 29 Sep. 1980, pages 46-50, the crosslinking action and crosslinkable polymers are described. Polyolefins which are suitable for the present invention are described in Modern Plastics Encyclopedia 89, pages 63-67 and 74-75. By way of example, mention may be made of linear low density polyethylene, low density polyethylene, high density polyethylene, chlorinated polyethylene, ethylene-propylene-diene terpolymers (EPDM), ethylene-vinyl acetate copolymers, ethylene-propylene copolymers, silicone rubber, chlorosulphonated polyethylene, fluoroelastomers, natural rubber (NR), polyisoprene (IR), polybutadiene (BR), acrylonitrile-butadiene copolymers (NBR) or styrene-butadiene copolymers (SBR).

Mention may also be made of ethylene-methyl (meth) acrylate copolymers and ethylene-glycidyl methacrylate copolymers.

The weight ratio of the free-radical initiator to the nitroxide (N) in the crosslinking composition (C) and in the crosslinkable composition (A) is preferably between 1 and 50 and advantageously between 2 and 10.

In the crosslinkable composition (A), the free-radical initiator preferably represents between 0.2% and 5% by weight of the amount of polymer and advantageously between 0.5% and 3% by weight.

In addition to the constituents mentioned above, the compositions (A) and (C) may comprise antioxidants, stabilizers, plasticizers and inert fillers such as silica, clay or calcium carbonate.

The compositions (A) and (C) may comprise two or more nitroxides (N). They may also comprise two or more free-radical initiators.

According to the process of the present invention, the crosslinking temperature may be between 110 and 220° C. and preferably between 140 and 200° C.

Advantageously, the process is implemented in the presence of an amount of initiator and of nitroxide such that the initiator/polymer and nitroxide/polymer weight ratios are close to those of composition (A).

The conversion of the crosslinkable compositions into moulded or extruded articles may be carried out during or after crosslinking.

Experimental Section
In the text hereinbelow, the following abbreviations are used:

$M_H$: the maximum value of the torque obtained from the curve recorded by the rheometer. This value determines the crosslinking density.

$T_{90}$: curing time, the time required to reach 90% of the maximum torque at a given temperature.

$T_{S5}$: scorch time, the time required at a given temperature for the torque to increase by 5 Mooney units.

The crosslinking density ($M_H$) and the crosslinking time ($T_{90}$) of the blend obtained were measured at 180° C. using a Monsanto ODR 2000 E rheometer (Alpha Technologies, oscillation arc: 3°, oscillation frequency: 100 cycles/min).

The crosslinking time is also determined using the rheometer used under the same conditions as above.

The scorch time was measured at 145° C. using a Mooney MV 2000 viscometer (Alpha Technologies).

EXAMPLE 1

Not in Accordance with the Invention 1,000 g of low density polyethylene (Mitene sold by Ashland), 25 g of dicumyl peroxide (Luperox® DC) and 3 g of 2,2,6,6-tetramethylpiperidyloxy (TEMPO) were mixed together in a turbomixer at 80° C. (nominal temperature) for 15 minutes (stirring speed=930 rpm). The powder was then converted into a sample in the form of a disc by melting at 110° C. for 3 min. The sample was then placed in the rheometer or viscometer chamber.

EXAMPLE 2

Not in Accordance with the Invention

Example 1 was repeated without the use of 2,2,6,6-tetramethylpiperidyloxy. The results are given in Table 1. The comparison of Examples 1 and 2 shows that the higher scorch time with TEMPO is accompanied by a large decrease in the crosslinking density and a slight increase in the crosslinking time.

EXAMPLE 3

The process is performed as described in Example 1, except that the 3 g of 2,2,6,6-tetramethylpiperidyloxy are replaced with 4.4 g of NT1 (2,2,6,6-tetra-methyl-4-piperidyloxy methacrylate) so as to carry out a comparison for an equivalent concentration of nitroxide function.

The comparison of the results with those obtained in the preceding examples shows unambiguously that this nitroxide makes it possible to increase the scorch time while at the same time increasing the crosslinking density.

TABLE 1

| Additive | Maximum torque at 180° C. ($M_H$) (N.m) | Scorch time at 145° C. ($T_{s5}$) (min:s) | Crosslinking time at 180° C. ($T_{90}$) (min:s) |
|---|---|---|---|
| Example 1 | TEMPO | 1.21 | 19:00 | 7:10 |
| Example 2 | — | 1.95 | 8:40 | 6:50 |
| Example 3 | NT1 | 2.42 | 14:10 | 6:20 |
| Example 4 | — | 5.94 | 2:50 | 5:21 |
| Example 5 | OH-TEMPO | 5.14 | 16:19 | 5:39 |
| Example 6 | NT1 | 6.14 | 15:47 | 4:12 |

EXAMPLE 4

Not in Accordance with the Invention 318 g of compound EPDM DIN 7863 (containing 100 g of ethylene-propylene-diene terpolymer and 218 g of fillers) were conditioned in a Banbury-type mixer with a volume of 350 cm³ at 50° C. for 5 minutes at a speed of 50 revolutions/min. 8 g of Luperox F40ED (40% di(tert-butylperoxyisopropyl)benzene and 60% inert fillers) were added and mixed with the compound for 5 minutes at 50° C. at a speed of 50 revolutions/min.

EXAMPLE 5

Not in Accordance with the Invention

Example 4 is repeated but with the addition not only of the Luperox F40ED but also of 0.677 g of 4-hydroxy-2,2,6,6-tetramethylpiperidyloxy (OH-TEMPO).

EXAMPLE 6

Example 5 is repeated but adding, instead of the OH-TEMPO, 0.931 g of NT1.

What is claimed is:

1. A scorch-retardant crosslinking composition comprising a linear or mono-ring nitroxide (N) containing at least one unsaturation and a free-radical initiator comprising an organic peroxide, an azo compound, or mixtures thereof.

2. A scorch-retardant crosslinking composition comprising a nitroxide (N) containing at least one unsaturation and a free-radical initiator comprising an organic peroxide, an azo compound, or mixtures thereof, wherein said nitroxide (N) is represented by formulae (I) to (III):

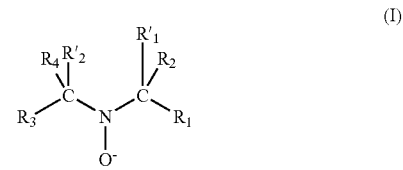

(I)

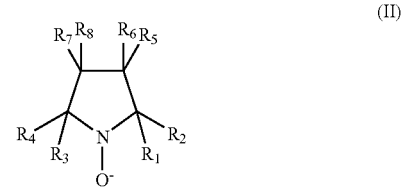

(II)

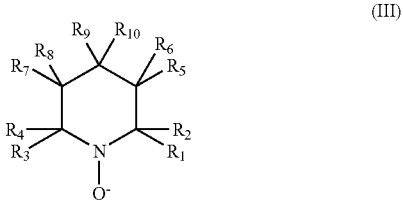

(III)

in which at least one of the substituents $R'_1$, $R'_2$, $R_1$, $R_2$, $R_3$, $R_4$, $R_5$, $R_6$, $R_7$, $R_8$, $R_9$ and $R_{10}$ contains at least one unsaturation which is reactive towards free-radical addition; the remaining substituents, which may be identical or different, represent a hydrogen atom, a halogen atom, a linear, branched or cyclic, saturated hydrocarbon-based group, a substituted aromatic group, a cyano group —CN, an amide group —CONRR$_a$, an ester group —COOR, an alkoxy group —OR, a phosphonate group —PO(OR)(OR$_a$), a hydroxyl group —OH or an acid group; R and R$_a$, which may be identical or different, may represent a hydrogen atom, a linear, branched or cyclic alkyl group containing a number of carbons ranging from 1 to 20, or an optionally substituted phenyl group.

3. The composition of claim 2, wherein said halogen atom is fluorine, chlorine, bromine or iodine.

4. The composition of claim 2, wherein said saturated hydrocarbon based group is an alkyl radical.

5. The composition of claim 2, wherein said acid group is —COOH or —PO(OH)$_2$ or SO$_3$H.

6. The composition of claim 2, wherein the substituents containing at least one unsaturation each represent a linear, branched or cyclic unsaturated hydrocarbon-based group or an acrylate, methacrylate, acrylamide or methacrylamide group.

7. The composition of claim 2, wherein R and R$_a$ may represent a cyclic alkyl group containing a number of carbons ranging from 1 to 20, or a substituted phenyl group.

8. A scorch-retardant crosslinking composition comprising a nitroxide (N) containing at least one unsaturation and a free-radical initiator comprising an organic peroxide, an azo compound, or mixtures thereof, wherein said nitroxide (N) is represented by formula (IV):

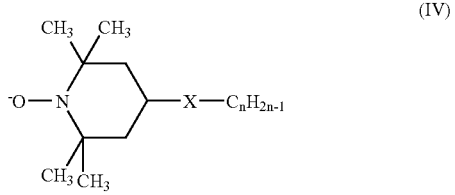

in which X represents a divalent group —OC(O)—, —NR$_b$C(O)— or —P(O)(OR$_b$)O— with R$_b$ having the same meaning as R and n is an integer ranging from 2 to 20.

9. The composition of claim 8, wherein n ranges from 2 to 10.

10. The composition of claim 8, wherein the nitroxide (N) is:

2,2,6,6-tetramethyl-4-piperidyloxy acrylate,
2,2,6,6-tetramethyl-4-piperidyloxy methacrylate,
2,2,6,6-tetramethyl-4-piperidyloxyacrylamide, or
2,2,6,6-tetramethyl-4-piperidyloxymethacrylamide.

11. The composition of claim 1, 2 or 8 wherein the free-radical initiator is dicumyl peroxide or α, α'-di[(t-butylperoxy)isopropyl]benzene.

12. The composition of claim 1, 2 or 8 further comprising a thermoplastic polymer and/or an elastomeric polymer.

13. The composition of claim 12, wherein the polymer is a low density polyethylene, a high density polyethylene, a chlorinated polyethylene, an ethylenepropylene-butadiene terpolymer, an ethylene-vinyl acetate copolymer, an ethylenepropylene copolymer, a silicone rubber, a chlorosulphonated polyethylene, a fluoroelastomer, an ethylene-methyl (meth)acrylate copolymer or an ethyleneglycidyl methacrylate copolymer.

14. The composition of claim 1, 2 or 8 wherein the weight ratio of the free radical initiator to the nitroxide (N) is between 1 and 50.

15. The composition of claim 14, wherein the weight ratio is between 2 and 10.

16. The composition of claim 12, wherein the free-radical initiator represents between 0.2% and 5% by weight of the amount of polymer.

17. The composition of claim 16, wherein the free radical initiator represents between 0.5% and 3% by weight of the amount of polymer.

18. A process for crosslinking a crosslinkable composition comprising a thermoplastic polymer and/or an elastomeric polymer which may be crosslinked with a peroxide or an azo compound, comprising the step of mixing said polymer with a free-radical initiator comprising an organic peroxide, an azo compound, or mixtures thereof, in the presence of a linear or mono-ring nitroxide (N) containing at least one unsaturation and a free-radical initiator comprising an organic peroxides, an azo compound, or mixtures thereof.

19. The process of claim 18, comprising converting the crosslinkable composition into molded or extruded articles during or after crosslinking.

20. Molded or extruded articles obtained according to the process of claim 19.

* * * * *